US006892184B1

(12) United States Patent
Komem et al.

(10) Patent No.: US 6,892,184 B1
(45) Date of Patent: May 10, 2005

(54) SYSTEM AND METHOD FOR MULTIPLE CURRENCY TRANSACTIONS

(75) Inventors: Ofer Komem, Ramat Gun (IL); Yuval Tai, Tel Aviv (IL); Miki Ishal, Ramat Gan (IL); Zelig Shalgl, Tel Aviv (IL); Eyal Carmon, Ramat Hasharon (IL)

(73) Assignee: E4X Inc., New York, NY (US)

( * ) Notice: Subject to any disclaimer, the term of this patent is extended or adjusted under 35 U.S.C. 154(b) by 533 days.

(21) Appl. No.: 09/597,461

(22) Filed: Jun. 19, 2000

(51) Int. Cl.[7] .............................................. G06F 17/60
(52) U.S. Cl. ......................................... 705/26; 705/35
(58) Field of Search ............................. 705/26, 35, 39

(56) References Cited

U.S. PATENT DOCUMENTS

| | | |
|---|---|---|
| 5,077,804 A | 12/1991 | Richard |
| 5,457,797 A | 10/1995 | Butterworth et al. |
| 5,644,721 A | 7/1997 | Chung et al. |
| 5,671,363 A | 9/1997 | Cristofich et al. |
| 5,852,812 A | 12/1998 | Reeder |
| 5,884,274 A | 3/1999 | Walker et al. |
| 5,897,621 A | 4/1999 | Boesch et al. |
| 5,920,847 A | 7/1999 | Kolling et al. |
| 5,963,647 A | 10/1999 | Downing et al. |
| 5,963,923 A * | 10/1999 | Garber .......................... 705/37 |
| 6,041,312 A | 3/2000 | Bickerton |
| 6,065,673 A | 5/2000 | Kokkila |
| 6,073,116 A * | 6/2000 | Boyle ........................... 705/36 |
| 6,199,046 B1 * | 3/2001 | Heinzle et al. ................. 705/1 |
| 6,513,019 B2 * | 1/2003 | Lewis .......................... 705/35 |
| 6,598,028 B1 * | 7/2003 | Sullivan et al. ............... 705/35 |

FOREIGN PATENT DOCUMENTS

| | | | | |
|---|---|---|---|---|
| WO | WO 02071194 | * | 3/2000 | .................. 705/26 |

OTHER PUBLICATIONS

Turton, Jonathan; "Seven different solutions to the burning issues", Corporate Finance, May 2000.*

* cited by examiner

*Primary Examiner*—Michael Cuff
(74) *Attorney, Agent, or Firm*—G.E. Ehrlich (1995) Ltd.

(57) ABSTRACT

A system and a method for supporting e-commerce transactions in multiple currencies, in which the local currency of the buyer is different from the local currency of the vendor, such that the exchange between the currencies is hedged at the time of sale of the product. The system and method enable the buyer to receive a final price for the product before the transaction is performed. The system and method also provide a mechanism for the actual exchange between the currencies of the buyer and of the vendor, such that the aspects of the transaction regarding payment are fully supported. Preferably, online hedging of the currency transactions is performed, in order to reduce the risk involved with predetermination of prices.

26 Claims, 4 Drawing Sheets

SYSTEM AND METHOD FOR MULTIPLE CURRENCY TRANSACTIONS

FIELD OF THE INVENTION

The present invention relates to a system and a method for transactions in a plurality of currencies, and in particular, to such a system and method which enable a price of a product to be accurately determined in the plurality of currencies before the transaction is performed. The transaction is "hedged", preferably through risk management of the currency transactions, such that the final price of the product is guaranteed to the seller of the product in the local currency of the seller, and to the buyer of the product in the local currency of the buyer.

BACKGROUND OF THE INVENTION

The Internet has enabled computer users all over the world to interact and communicate electronically. One particularly popular mode for communication is through Web pages, which collectively form the World Wide Web. Web pages are useful for displaying text and graphics, and even animation, video data and audio data. Unsurprisingly, Web pages have also become popular for electronic commerce (e-commerce), as they enable vendors to display various types of goods to users, and to effectively advertise these goods. A large number of Web sites are currently devoted to e-commerce, and users can purchase a wide range of goods, from books to electronic equipment and even perishable goods, such as groceries.

Part of the attraction to producing a Web site for e-commerce is that international sales of products are possible. Computer users can view and purchase products without being in the physical "brick and mortar" store of the vendor, and even without being in the same geographical area. However, although the Internet and the World Wide Web have easily crossed international boundaries for communication, e-commerce is still hampered by the requirement for payment in the currency of a particular country. Typically, a vendor must be paid in the currency of the vendor's own country, which may be different from that of the buyer.

The problem has been at least partially solved through credit cards which can be used for purchases internationally. Such credit cards enable a buyer to purchase goods through e-commerce from a vendor in a different country. However, although credit card companies handle currency transactions from the currency of the buyer to the currency of the vendor, thereby enabling multiple currency e-commerce transactions to occur, the final cost may vary widely. For example, credit card companies may use a conversion rate which is less favorable to the user, than if the user had performed the currency transaction through a bank or other financial institution. In other cases, e-commerce Web sites which attempt to provide information concerning the final cost of their goods in a variety of currencies may find that changes in the currency market have caused their prices to be inaccurate, thereby exposing the vendors to currency risks, regardless of the actions of the credit card companies.

In addition, vendors who wish to support transactions in multiple currencies, regardless of the risk, must also handle complex accounting issues in these multiple currencies.

A more useful solution to this problem would enable the buyer to purchase goods with currency which is local to the buyer, at a price which is known to the buyer in advance, through e-commerce Web sites on an international basis. This solution would enable the buyer to examine goods from the Web site of choice, and then to view information concerning the final cost of these goods in the buyer's own currency, regardless of the currency of vendor. In addition, such a solution would enable the vendor to handle transactions with only a single currency, thereby minimizing risk and simplifying accounting issues, while still enabling the buyers to use the currency of choice for purchases. Unfortunately, such a solution is not currently available.

In a B2B (business to business) scenario, a different set of problems may arise with regard to currency transactions. In one scenario, the buyer may negotiate to purchase goods from the seller through the Internet, such as through a Web site, or through other means. The buyer guarantees payment to the seller for the goods via a payment mechanism. There are several payment mechanisms available to guarantee large amount transfers between business trading partners, including Letter of Credit, Swift, ACH and others. On-line hedging mechanisms, which would support these types of transactions at the point of "sale", or business transaction, would also be useful, but unfortunately are not available.

Therefore, there is an unmet need for, and it would be highly useful to have, a system and a method for multiple currency transactions for e-commerce, whether from a business to a consumer or between businesses, in which the final price of the product is given to the buyer in the local currency of the buyer before a purchase is made, and such that a final price is also guaranteed to the seller in the local currency of the seller, through hedging of the currency transaction on behalf of the seller, preferably with associated risk management on behalf of the central managing entity.

SUMMARY OF THE INVENTION

The present invention of a system and a method for supporting e-commerce transactions in multiple currencies, in which the local currency of the buyer is different from the local currency of the vendor. The system and method enable the buyer to receive a final price for the product in the local currency of the buyer before the transaction is performed, and also enable the vendor to receive a guarantee for the price in the local currency of the vendor, before the amount of payment is exchanged. The system and method also provide a mechanism for the actual exchange between the currencies of the buyer and of the vendor, such that the aspects of the transaction regarding payment are fully supported. More preferably, the buyer and/or the vendor are charged a fee for performing such a guaranteed exchange, for example by incorporating such a fee into the rate which is given to the buyer. Thus, even before the settlement date, at which point the transaction is completed and the amount of payment has been received from the buyer and given to the vendor, the final price is guaranteed, or "hedged".

Preferably, risk management is applied to the currency transactions, by combining a plurality of such transactions such that the amount of currency can be managed through international currency trading, in order to minimize any loss which may occur as a result of fluctuations in the exchange rates.

According to the present invention, there is provided a method for supporting a transaction for purchasing a product by a buyer from a vendor, the product having a price, a local currency of the buyer being different from a local currency of the vendor, the buyer communicating with the vendor through a network, the method comprising the steps of: (a) determining an exchange rate of the local currency of the vendor to the local currency of the buyer; (b) converting the price of the product from the local currency of the vendor to the local currency of the buyer to form a final price according to the exchange rate, such that the buyer receives information concerning the final price before a payment transaction is performed; (c) receiving payment from the buyer for the final price to perform the payment transaction; (d) converting the payment from the local currency of the buyer to the local currency of the vendor to form a converted payment according to the exchange rate; and (e) paying the vendor with the converted payment.

According to another embodiment of the present invention, there is provided a method for performing online hedging at a point of sale for a transaction for purchasing a product by a buyer from a vendor, the product having a price, a local currency of the buyer being different from a local currency of the vendor, the buyer communicating with the vendor through a network, the method comprising the steps of: (a) determining an exchange rate of the local currency of the vendor to the local currency of the buyer; (b) converting the price of the product from the local currency of the vendor to the local currency of the buyer to form a final price according to the exchange rate, such that the buyer receives information concerning the final price before a payment transaction is performed; (c) hedging the payment transaction; (d) receiving payment from the buyer for the final price to perform the payment transaction; (e) converting the payment from the local currency of the buyer to the local currency of the vendor to form a converted payment according to the exchange rate; and (f) paying the vendor with the converted payment.

According to yet another embodiment of the present invention, there is provided a system for supporting a transaction for purchasing a product by a buyer from a vendor, the product having a price, a local currency of the buyer being different from a local currency of the vendor, the system comprising: (a) a currency server for receiving an exchange rate from the local currency of the buyer to the local currency of the vendor; (b) a vendor server for operation by the vendor, the vendor server receiving the exchange rate from the currency server and the vendor server converting the price from the local currency of the vendor to the local currency of the buyer to form a final price, the vendor server providing a Web page containing information about the product and the final price; (c) a Web browser for interaction with the buyer, the Web browser being operated by a buyer computational device, the buyer computational device being connected to the vendor server through the network, such that the Web browser displays the Web page and receives financial information from the buyer for purchasing the product according to the final price, the financial information being sent to the vendor server; and (d) a central managing entity for receiving the financial information from the vendor server and for establishing the exchange rate between the local currency of the buyer and the local currency of the vendor, the central managing entity receiving payment from the buyer in the local currency of the buyer, the central managing entity exchanging the payment to the local currency of the vendor, and the central managing entity paying the vendor, such that a transaction between the vendor and the buyer is hedged by the central managing entity.

Hereinafter, the term "network" refers to a connection between any two or more computational devices which permits the transmission of data.

Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, PDA (personal data assistant) devices, cellular telephones, any type of WAP (wireless application protocol) enabled device, wearable computers of any sort, which can be connected to a network as previously defined and which has an operating system. Hereinafter, the term "Windows™" includes but is not limited to Windows95™, Windows 3.xi™ in which "x" is an integer such as "1", Windows NT™, Windows98™, Windows CE™, Windows2000™, and any upgraded versions of these operating systems by Microsoft Corp. (USA).

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functions performed by the method could be described as a plurality of instructions performed by a data processor.

Hereinafter, the term "Web browser" refers to any software program which can display text, graphics, or both, from Web pages on World Wide Web sites. Hereinafter, the term "Web server" refers to a server capable of transmitting a Web page to the Web browser upon request.

Hereinafter, the term "Web page" refers to any document written in a mark-up language including, but not limited to, HTML (hypertext mark-up language) or VRML (virtual reality modeling language), dynamic HTML, XML (extensible mark-up language) or XSL (XML styling language), or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
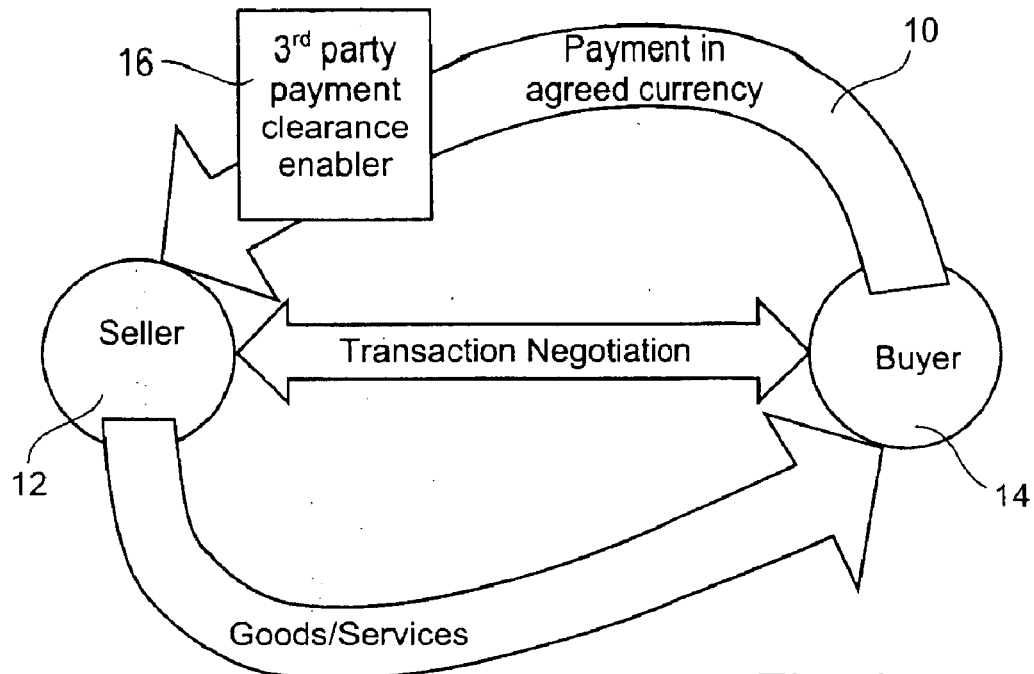
FIG. 1 is a schematic block diagram of a background art system.

The present invention is of a system and a method for supporting e-commerce transactions involving multiple currencies. The system and method convert the price of a product from the local currency of a vendor to the local currency of a buyer, when the currency of the vendor differs from that of the buyer. The buyer then receives the final price of the product in the local currency of the buyer, preferably including any transaction costs which may be incurred as a result of the currency exchange. The vendor also receives a guarantee for the final amount of payment which is to be received in the local currency of the vendor. Preferably, the guaranteed exchange rate is provided for a predetermined period of time. Also preferably, the buyer and/or the vendor are charged a fee for performing such a guaranteed exchange, for example by incorporating such a fee into the rate which is given to the buyer. Thus, hedging is provided for the transaction at the point of sale for e-commerce activities, which has not been previously provided in the art.

Once the buyer decides to purchase the product, the financial payment details of the buyer are sent to a particular payment mechanism. The mechanism receives the amount of payment in the local currency of the buyer from the buyer. The payment is converted to the local currency of the vendor according to the system of the present invention, which may optionally be completely separate from the payment mechanism which receives payment from the buyer. The vendor then receives payment in the local currency of the vendor. Preferably, a plurality of transactions is combined for the step of conversion, rather than buying and selling currencies separately for each transaction.

According to a preferred embodiment of the present invention, the vendor may optionally allow the buyer to pay for a product with a plurality of separate payments at different points in time, for payment in installments. For example, the buyer may be allowed to pay for the product with a plurality of monthly payments. From the perspective of the vendor, such a plurality of separate payments may potentially increase the risk associated with fluctuating exchange rates. The present invention overcomes such a risk by enabling a plurality of exchange rates to be set, exchange rate being valid for at least one of the separate payments, and each exchange rate therefore reflecting the potential associated risk. Each of the plurality of exchange rates is therefore guaranteed for a separate predetermined period of time.

According to another preferred embodiment of the present invention, the vendor may optionally pay a plurality of suppliers of products in a plurality of local currencies of the suppliers, while in turn accepting payment from a plurality of buyers in a plurality of local currencies of the buyers. In this case, multiple exchange rates are set, including at least a first exchange rate for paying at least one supplier by the vendor and at least a second exchange rate for paying the vendor by at least one buyer. Each of the first and the second exchange rates is therefore guaranteed for a separate predetermined period of time. One example of such a vendor is a travel agent who wishes to sell hotel rooms. The hotel typically wishes to receive payment in the local currency, while a customer would want to pay for the hotel room in another, potentially different local currency. The present invention enables the vendor to apply online hedging at the point of sale, so that the vendor is protected from currency risks on transactions with both suppliers and buyers.

Preferably, risk management is provided for the currency transactions, through international currency trading, in order to minimize any loss which may occur as a result of fluctuations in the exchange rates. The present invention is thus able to advantageously use the currency conversion with bulk transactions for both greater efficiency and to lower the costs of such currency exchanges.

The present invention preferably also provides for security and verification mechanisms, in order to ensure that vendors receive the proper payment, and that the correct currency exchange rates are used for calculating the prices and for effecting payment to the vendors.

According to a particular preferred implementation of the present invention, there is provided software components and services to enable multi-currency e-commerce, allowing vendors to conduct their operations in a single currency while accepting payments in multiple currencies. The central managing entity for these transactions is responsible for hedging transactions against currency fluctuations, thereby ensuring that the vendor receives complete payment for goods in the local currency of the vendor. Thus, vendors are assured that the expected prices which are established for goods match funds received in their bank accounts, through hedging of the transaction at the point of sale, while buyers are able to determine the final price for a product in the local currency of the buyer at the time of sale.

With the trend towards expanded on-line international trading activity, ease of use, cost effectiveness and immediacy become top priorities. The online point-of-sale hedging and transaction exchange services of the present invention reduce complexity of international e-commerce transactions.

Furthermore, the described solution of the present invention is independent of applied payment mechanisms, and does not assume liabilities for financial settlements or delivery of products. These liabilities remain with the banks, credit card companies and shipping companies, as they do in a non-Internet and/or non e-commerce environment.

The principles and operation of the present invention may be better understood with reference to the drawings and the accompanying description.

Referring now to the drawings, FIG. 1 is a schematic block diagram of a background art system for a typical single currency online transaction, as such a transaction is currently performed according to the background art.

In a typical online transaction 10, a vendor 12 and a buyer 14 negotiate online to exchange goods or services for payment. By "online", it is meant that communication is performed through an electronic communication medium, including but not limited to, telephone voice communication through the PSTN (public switched telephone network), cellular telephones or a combination thereof; exchanging information through Web pages according to HTTP (HyperText Transfer Protocol) or any other protocol for communication with and through markup language documents; exchanging messages through e-mail (electronic mail), messaging services such as ICQ™ for example, and any other type of messaging service; as well as any other type of communication which incorporates an electronic medium for transmission.

Vendor 12 agrees to deliver goods or services to buyer 14, who in turn contracts to pay a negotiated amount in a negotiated currency to vendor 12 in exchange for the product(s) (goods and/or services).

As shown in FIG. 1, typically, a third party payment clearance service 16 enables the transaction to occur, by providing varying degrees of assurance for the flow of payment from buyer 14 to vendor 12. Such a service is particularly useful for transactions when buyer 14 and vendor 12 are physically separated, as for example in e-commerce transactions. Third party payment clearance service 16 allows vendor 12 to ship goods prior to settlement of cash in his bank. Various types of third party payment clearance services exist, providing different degrees of assurance for the ultimate flow and deposition of funds, as well as different settlement periods for delivery of funds.

Third party payment clearance service 16 acts as a bridge between the "virtual" Internet world and the "real" financial world, and as previously described, is currently used for e-commerce transactions.

Figure 2:
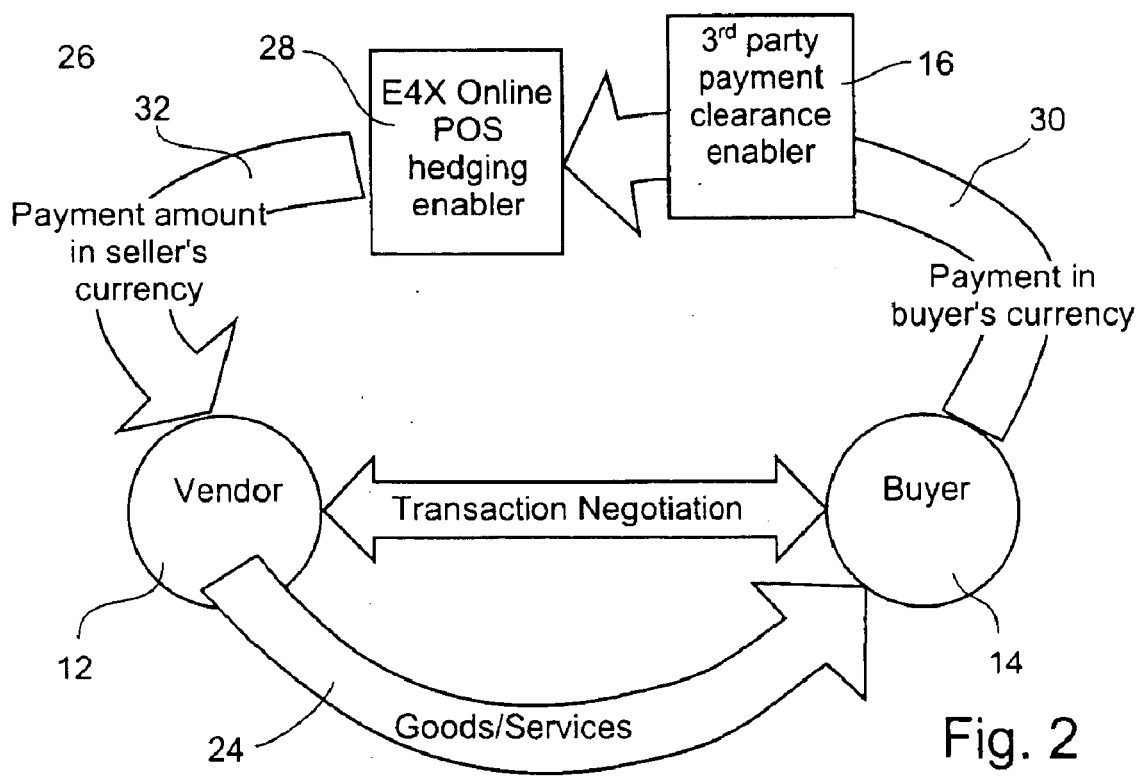
FIG. 2 is a schematic block diagram of an exemplary system according to the present invention.

As shown in FIG. 2, the system according to the present invention for supporting e-commerce transactions involving multiple currencies can optionally be implemented with the third party payment mechanism, although this mechanism is not required, as the present invention does not rely upon the use and/or provision of such a clearance service; if online payment mechanisms become available in the future which do not require a third party to guarantee the transfer of funds, the present invention could also optionally be used with such online payment mechanisms. Examples of various types of online payment mechanisms include, but are not limited to, e-money cards and accounts, and micropayment mechanisms of various types.

The schematic block diagram shows the flow through an exemplary system 20 for providing a guaranteed price to both buyer 14 and vendor 12 in their respective local currencies through hedging at the point of sale, supported through the direct exchange of funds, preferably by including the process of risk management for the actual conversion of the funds. As for FIG. 1, buyer 14 and vendor 12 engage in an online transaction, with a direct negotiation flow 22 for the actual purchase of the product, whether goods or services. Again, buyer 14 receives the product through a product exchange flow 24 after the process of fund transfer has occurred, or at least has been guaranteed to occur such that vendor 12 is satisfied.

Unlike FIG. 1, however, system 20 provides currency hedging at an on-line point-of-sale 26. An hedging enabler process 28 is inserted between the process for receiving payment 30 from buyer 14, and a process for effecting payment 32 to vendor 12. Hedging enabler process 28 is also optionally and preferably described as a central managing entity, as hedging enabler process 28 preferably manages the transactions.

Hedging enabler process 28 determines the actual amount of payment required from buyer 14, in order to pay the requested amount to vendor 12 in the local currency of vendor 12. Preferably, hedging enabler process 28 combines a plurality of such transactions, in order to more effectively exchange currencies through the international currency exchange market, optionally and more preferably with risk management. Thus, hedging enabler process 28 receives the price from vendor 12, determines the appropriate exchange rate from the local currency of vendor 12 to the local currency of buyer 14, and then provides the price to buyer 14, while also guaranteeing that vendor 12 will receive the full payment in the local currency of vendor 12 at a future settlement date. This entire process can also be described as hedging at the point of sale.

If buyer 14 decides to purchase the product, then the amount of payment is determined according to these previously defined prices. The solution protects vendor 12 from currency fluctuations occurring between the time of price negotiation and the time of payment settlement. Since a plurality of such transactions are preferably aggregated, the aggregated positions can optionally be managed for risk in the inter-bank market by applying standard risk management strategies, previously available for large transaction amounts only.

The solution of system 20 is widely applicable for online hedging for all types of online multi-currency trading interactions, regardless of the size of the transaction, regardless of the relationship between parties (business-to-business, business-to-consumer, consumer-to-consumer) and regardless of the mechanism which is used to assure payment. Although third party payment clearance service 16 may be involved as shown, such a service is an optional component of system 20. Also optionally and more preferably, a plurality of third party payment clearance services 16 (not shown) may be involved, such that vendor 12 can optionally receive payment in parallel from several third party payment clearance services 16, which is a preferred feature of the present invention.

Figure 3:
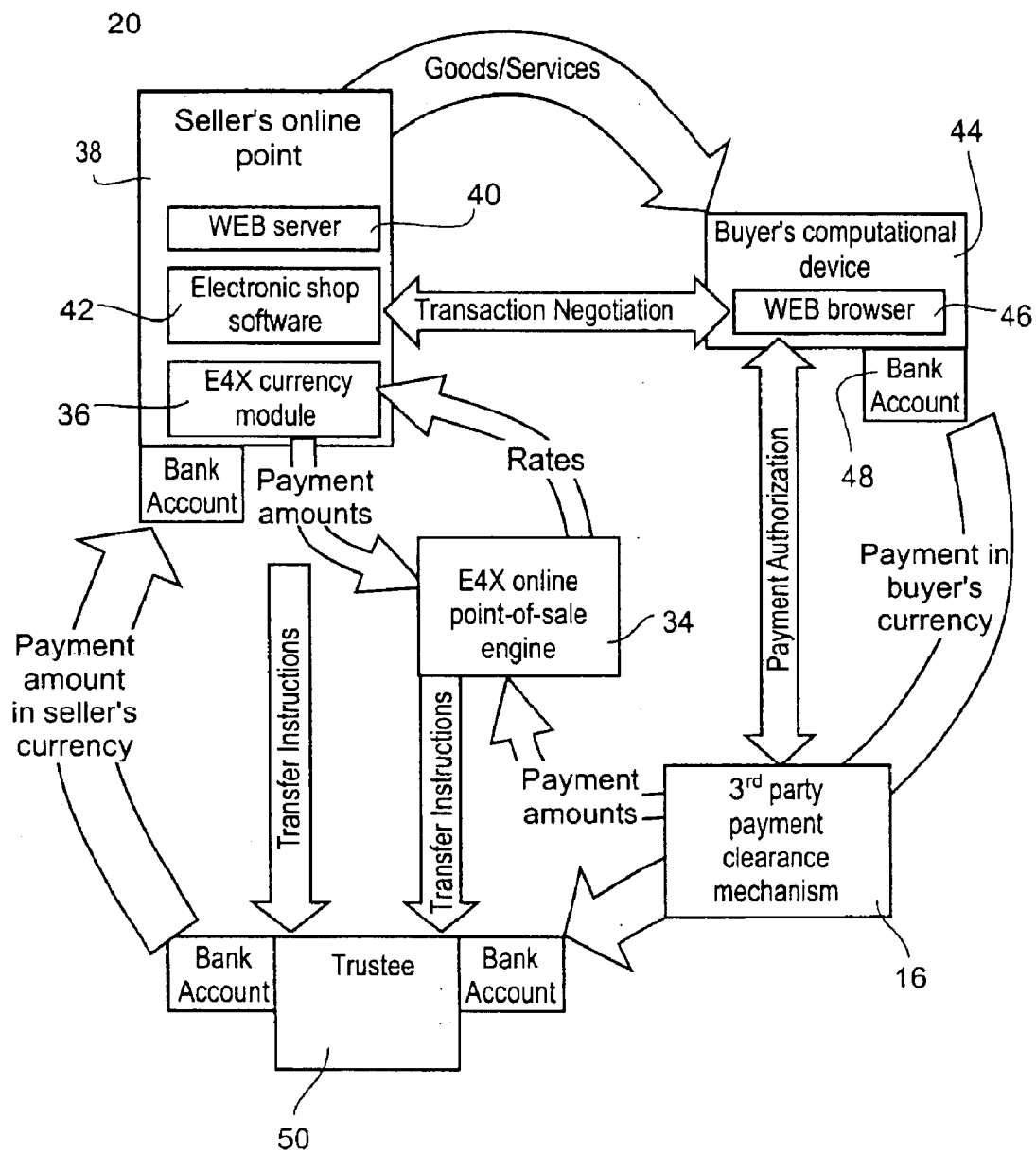
FIG. 3 is a schematic block diagram of certain components of FIG. 2 in greater detail.
Figure 3:

FIG. 3 is a schematic block diagram of a more detailed exemplary implementation of system 20, showing the flow of the processes through system 20. System 20 preferably features a hedging engine 34, which is the core component for distributing currency rates, receiving payment information from vendor 12 and also optionally receiving payment information from third party clearance mechanism 16.

With regard to the first function, hedging engine 34 sends updated currency rates to a currency module 36 installed at a vendor server 38. The combination of hedging engine 34 and currency module 36 is optionally and preferably described as a "central managing entity", as these two components together support and control the process of hedging at the point of sale.

Vendor server 38 may optionally include such functions as a Web server 40, for providing Web pages for e-commerce through Web-based communication, and also electronic shop software module 42, for managing e-commerce, accounting and other functions of vendor 12. However, with regard to the present invention, currency module 36 is the required feature of vendor server 38, as these other functions may optionally be moved to a different server and/or replaced with other types of functionality.

Currency module 36 receives the rate exchange information from hedging engine 34, preferably at intervals which are defined by vendor 12, more preferably with a margin supplement as per agreement with vendor 12. The margin supplement is an additional fee, which is optionally added to each transaction, whether directly or indirectly, for example through the determination of the exchange rate. When currency module 36 receives a request from electronic shop software module 42 for a price in a particular local currency for buyer 14, currency module 36 calculates the price in the local currency of buyer 14.

As shown for this optional but preferred implementation of system 20 for Web-based communication, buyer 14 interacts with a buyer computational device 44, which in turn operates a Web browser 46. Web browser 46 receives Web pages from Web server 40. Each such Web page may optionally include information about the product to be purchased, including, for example, the price in the local currency of buyer 14. For this implementation, the transaction negotiation between buyer 14 and vendor 12 occurs through Web-based communication, such that buyer 14 enters information and/or commands through Web browser 46, and in turn receives information through Web pages from Web server 40.

Preferably, electronic shop software module 42 interacts with currency module 36 in order to receive the price in the local currency of buyer 14, for adding this price dynamically to Web pages which are served by Web server 40. Also optionally and preferably, the type of local currency for buyer 14 is automatically determined by currency module 36 through the use of DNS lookup information or cookies. Buyer 14 is preferably able to override such an automatic currency detection mechanism by entering the preferred currency manually.

Once buyer 14 has decided to purchase the product, Web browser 46 is optionally redirected toward third party payment mechanism 16, for a typical payment process for e-commerce transactions. Third party payment mechanism 16 collects payment credentials from buyer 14, such as credit card details or other information. Third party payment mechanism 16 may optionally perform an authorization request to a buyer account 48, which could be a bank account and/or credit card account for example, in order to determine whether funds are available for the purchase. Following authorization, confirmation of the transaction is sent to buyer 14 and vendor 12. If a plurality of third party payment mechanisms 16 is available, then vendor 12 optionally and preferably is able to select a particular third party payment mechanism 16 for receiving payment from buyer 14, for example according to the criterion of the amount of fees which are charged by third party payment mechanism 16.

In addition, third party payment mechanism 16 also optionally sends the amount of authorized payment to hedging engine 34. Alternatively or additionally, currency module 36 can also send such information to hedging engine 34. Such information is preferably dynamically aggregated by hedging engine 34 with information collected from other vendors.

Foreign currency positions in each of the currencies for each settlement date are monitored by the operator of hedging engine 34, as described in greater detail with regard to FIG. 4 below. Associated currency dealers preferably manage the risks exposed by these positions using various risk management strategies, resulting in the execution of forward and options deals in the interbank market.

On the settlement date for at least one transaction, and preferably for a plurality of transactions, the actual payment is optionally and preferably sent to a trustee 50, in the currency of each buyer 14, for example from third party payment mechanism 16. Preferably simultaneously, hedging engine 34 provides instructions for transferring amounts for these transactions in the currencies expected by each vendor 12 to trustee 50. If the amounts transferred match the instructions received by vendor 12 and hedging engine 34, trustee 50 releases funds transferred by third party payment mechanism 16 to hedging engine 34, and also releases funds transferred by hedging engine 34 to vendor 12.

Although the use of such a trustee 50 is preferred, trustee 50 is not an essential component of system 20, as payment could be effected directly through hedging engine 34. Trustee 50 is useful in order to provide a guarantee that funds are transferred properly through system 20.

Figure 4:
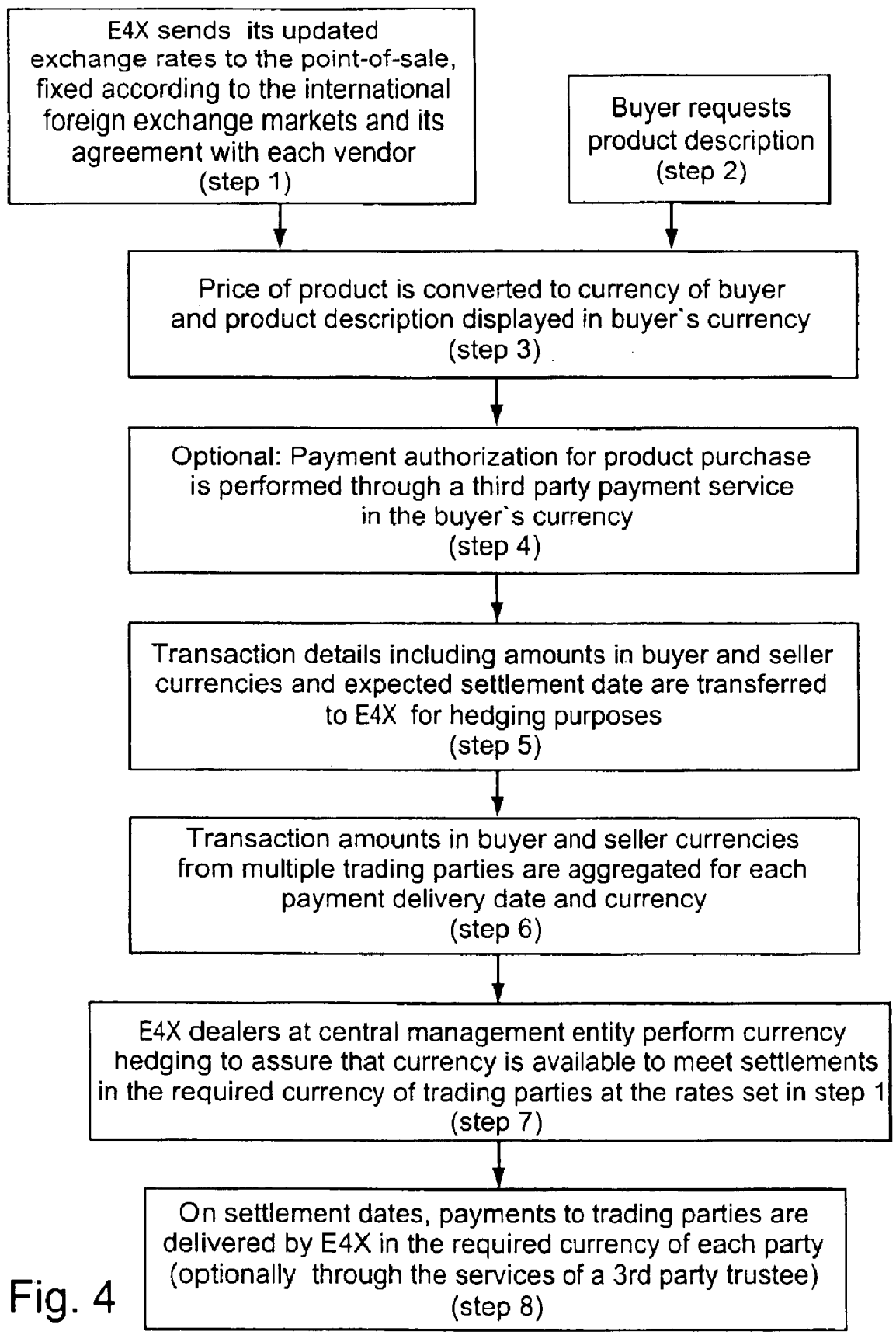
FIG. 4 is a flowchart of an illustrative method according to the present invention.

FIG. 4 is a flowchart of an exemplary but preferred method for performing the transaction of FIGS. 2 and 3, according to the present invention.

As shown, in step 1, the updated exchange rates are sent from the central managing entity which is managing the currency exchanges to the server of the vendor. For example, in FIG. 3, the hedging engine sent this information to the currency module on the vendor server. The exchange rate may optionally reflect a transaction or margin fee, in addition to the exchange rates which are available through the FOREX markets.

In step 2, the buyer requests a description of the product through online communication, for example through the Web browser of the buyer computational device as explained in FIG. 3. In step 3, the price of the product is converted to the currency of the buyer, and is preferably displayed to the buyer, for example through a Web page.

In step 4, optionally payment authorization for purchasing the product is performed through a third party payment enabling mechanism, in the local currency of the buyer.

In step 5, transaction details, including the amount of the transaction in the currencies of the buyer and the vendor, are transferred to the central managing entity. These transaction details are used for the purposes of hedging the currency exchanges and settlement of the payment transactions in the currency of the vendor.

In step 6, preferably transaction amounts in the local currencies of the buyer and the vendor are aggregated, more preferably according to type of currency and payment delivery date (settlement due date).

In step 7, dealers who are associated with the central managing entity perform currency trades in order to assure that currency is available to meet the required settlements on the settlement due date. The amount of each such settlement is determined for each vendor, in the local currency of the vendor, according to a rate which is set in step 1. Thus, the amount of the transaction is fixed, yet the currency market may cause the exchange rate to fluctuate, such that the dealers are preferably able to mitigate any risk associated with such fluctuations by combining or aggregating transactions for hedging the aggregated positions.

Optionally and more preferably, step 7 is performed automatically, for example by software programs which monitor the positions held in each currency as well as the overall market behavior, in order to effect trades at the most advantageous moment for minimizing risk. In addition, also more preferably, risk is managed by guaranteeing a particular exchange rate for a limited period of time, such that the settlement date must fall within the time period for which hedging is guaranteed.

In step 8, on each settlement date, payments to the trading parties, such as the vendors, are delivered in the local currency of each party. Optionally, payment is effected through a trustee, as described with regard to FIG. 3.

Figure 5:
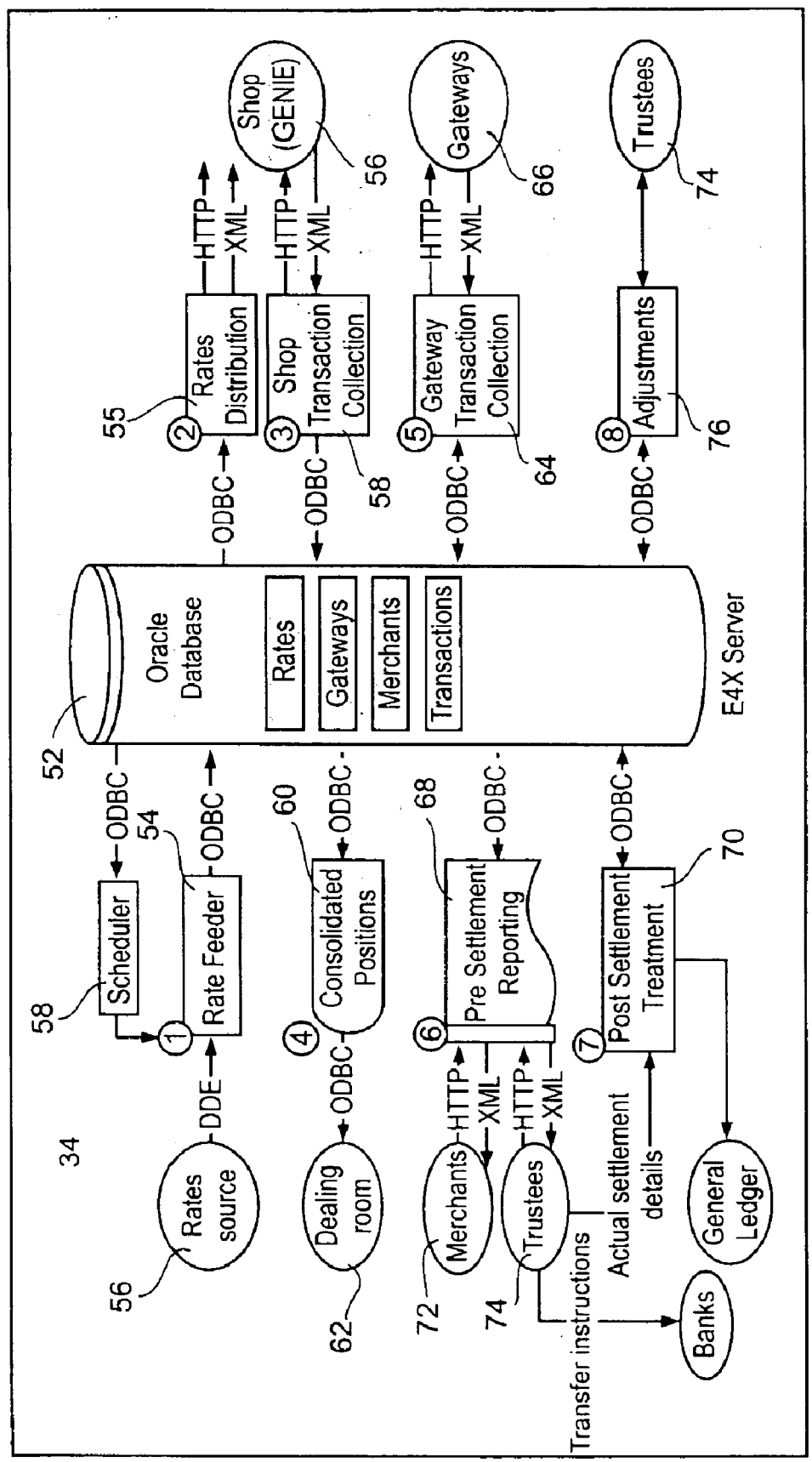
FIG. 5 is a detailed implementation of the central managing entity of FIG. 3 according to the present invention.

FIG. 5 is a schematic block diagram of an exemplary but preferred embodiment of hedging engine 34 of FIG. 3, showing the components of hedging engine 34 and their interaction with various other entities. Hedging engine 34 is a particularly important component of the central managing entity of FIG. 4, also previously described with regard to FIGS. 2 and 3.

The other entities which are separate from hedging engine 34 are shown only as general blocks, rather than with the specific technological features which would enable them to communicate with hedging engine 34, as such technological features are well known in the art and could easily be implemented by one of ordinary skill in the art.

As shown, hedging engine 34 preferably features a central database 52 for storing such information as the exchange rates, identification information for vendors, transaction information, and information about other parties involved in the transactions, such as third party payment mechanisms for example.

In a first process, a rate feeder 54 receives currency exchange rate information from a rate source 56, such as the FOREX markets for example. Optionally, rate feeder 54 receives such information periodically, according to a schedule 58. The rate information is posted to central database 52.

Next, the rates are distributed from central database 52 to a rate distribution module 55, and thence to an electronic shop software application 56 which contains the currency module of FIG. 3, as previously described with regard to FIG. 3. In turn, shop transaction information is received from electronic shop software application 56 by a shop transaction collection module 58. The transaction information is posted to central database 52.

Central database 52 also provides information about consolidated positions, preferably with regard to a plurality of transactions, to a consolidate position module 60, which in turn is accessed by a dealing "room" 62, managed by the central managing entity, for actually performing risk management on the transaction operations. Information concerning the outcome of such operations is also preferably stored in central database 52. Dealing "room" 62 may optionally be implemented manually, with one or more human dealers, but is preferably implemented automatically, with a software program for performing the trades as previously described.

A gateway transaction collection module 64 receives information about collected funds from a fund collection gateways 66, such as third party payment mechanisms for example, and transfers this information to central database 52. Reports, both before and after settlement of the payment, are optionally and more preferably provided by a pre-settlement reporting module 68 and a post-settlement reporting module 70, respectively. This information may optionally be provided to vendors 72 and/or trustees 74, for example. Any required adjustments are preferably performed through an adjustment module 76, with trustees 74.

According to optional features of the present invention, the system supports flexibly determined attributes or parameters which are controlled by trading partners, particularly vendors. Such parameters include, but are not limited to, the selection of supported currencies; treatment for taxes, shipping charges and other costs; support for price drift and mark-ups; risk management strategy for cancelled transactions; price differentiation by currency; periods for rate (price) fixing for each supported currency; rounding method per currency; and margin discounts based on transaction and settlement ceilings, settlement periods, payment installments and chargeback statistics. In addition, another such factor optionally includes the choice of the vendor to adjust the exchange rate with regard to a particular currency, for example in order to promote marketing and sales in a particular country as part of a marketing campaign. These parameters determine the margins and/or transaction fees which are added to the exchange rates quoted to vendors and together with statistics provided by the system, thus allowing risk to be managed by purchasing options contracts based on the expected transaction traffic flow.

With regard to the treatment of canceled payments and/or fraud, the system of the present invention preferably supports two alternative modes of risk management for trading partners. One mode involves the combination of all payment transactions registered by the vendor, (currency rate for return or chargeback transaction based on rate at day of settlement). Another mode involves the combination of all account activity including returns and chargebacks. Depending on the alternative selected by the vendor, positions will either reflect payment transactions only or all transactions in the database.

In addition, optionally the present invention is used for exchanging currencies which are not otherwise freely exchangeable directly. Such currencies can be exchanged if a mechanism exists for purchasing and/or selling an amount of such a currency in a different currency, such that eventually a directly exchangeable currency may be used to complete the transaction. Thus, the present invention is also suitable for currencies of smaller countries and/or countries with exchange restrictions, which might otherwise be difficult to exchange.

Various hedging strategies may optionally be used with the present invention. For example, the previously described dealing room preferably trades standard currency forward and options contracts in the inter-bank market to hedge against exposure to currency fluctuation risks.

Netting is preferably automatically performed by the system of the present invention, whereby an exposure to deliver yen to a vendor in Japan could optionally be offset against anticipated receipts in yen from Japanese buyers, for example.

While the invention has been described with respect to a limited number of embodiments, it will be appreciated that many variations, modifications and other applications of the invention may be made.

What is claimed is:

1. A method for supporting a transaction for purchasing a product by a buyer from a vendor, the product having a price, a local currency of the buyer being different from a local currency of the vendor, the buyer communicating with the vendor through an electronic network, the method comprising:

determining an exchange rate, obtained through the electronic network, of the local currency of the vendor to the local currency of the buyer and hedging to guarantee a future exchange of currency using said exchange rate, wherein said hedging is performed with at least one of an option or a forward contract;

converting the price of the product from the local currency of the vendor to the local currency of the buyer to form a final price according to said exchange rate, such that the buyer receives information according said final price before a payment transaction is performed;

receiving payment from the buyer for said final price to perform said payment transaction;

converting said payment from the local currency of the buyer to the local currency of the vendor to form a converted payment according to said exchange rate, wherein said exchange rate is guaranteed at a time of calculating said final price for the buyer, such that the price in the local currency of the vendor is guaranteed and such that the price in the local currency of the buyer is guaranteed for a predetermined period of time, and is hedged; and paying the vendor with said converted payment;

wherein at least said receiving said payment from the buyer, said converting said payment and said paying the vendor are hedged, such that a risk of a change in said exchange rate is hedged.

2. The method of claim 1, wherein said receiving payment from the buyer includes receiving payment from an account of the buyer in a financial institution, such that said financial institution does not perform said converting said payment from the local currency of the buyer to the local currency of the vendor to form a converted payment.

3. The method of claim 1, wherein the electronic network is the Internet.

4. The method of claim 3, wherein the seller has a Web site and the buyer purchases the product through said Web site to form an e-commerce transaction.

5. The method of claim 4, wherein said converting the price of the product further comprises:

receiving said exchange rate at said Web site;

converting the price according to said exchange rate to form said final price;

constructing a Web page including said final price; and displaying said Web page to the buyer.

6. The method of claim 5, wherein said converting said payment from the local currency of the buyer to the local currency of the vendor to form a converted payment further comprises:

providing a plurality of currency accounts, each currency account having a different type of currency; and transferring an amount of said payment from a currency account containing the local currency of the buyer to a currency account containing the local currency of the vendor to form said converted payment.

7. The method of claim 6, wherein said transferring an amount of said payment is performed for a plurality of payments from the buyer to the vendor, such that a plurality of converted payments are formed.

8. The method of claim 1, wherein said determining an exchange rate includes determining a plurality of exchange rates, each of said plurality of exchange rates being guaranteed for a separate predetermined period of time, wherein said converting the price of the product further comprises converting the price of the product to a plurality of payments for being paid by the buyer at a plurality of separate points in time, each payment being converted according to one of said plurality of exchange rates, such that said receiving payment from the buyer is performed repeatedly for each payment by the buyer.

9. The method of claim 1 wherein the vendor purchases a plurality of products from a plurality of suppliers, each supplier being paid in a separate local currency of said supplier, and wherein the vendor sells said plurality of products to a plurality of buyers, each buyer paying in a separate local currency of said buyer, such that said determining an exchange rate includes determining a first exchange rate for paying said supplier by the vendor and determining a second exchange rate for paying the vendor by said buyer, each of said first and said second exchange rates being guaranteed for a separate predetermined period of time.

10. The method of claim 1, wherein said determining an exchange rate further comprises:

receiving said exchange rate form a FOREX market rate; and transmitting said exchange rate to the vendor.

11. The method of claim 1, wherein said converting the price further comprises automatically detecting the preferred currency of the buyer.

12. The method of claim 10, wherein said converting the price further comprises automatically detecting the local currency of the buyer.

13. The method of claim 1, wherein said receiving payment from the buyer and said paying the vendor with said converted payment are performed through a trustee, such that said trustee receives payment from the buyer and gives payment to the vendor.

14. The method of claim 13, wherein said trustee receives payment for the vendor on a settlement date.

15. The method of claim 14, wherein said converting said payment from the local currency of the buyer to the local currency of the vendor to form a converted payment further comprises:

aggregating payments from a plurality of buyers;

exchanging said payments through a currency exchange market, to provide funds in the local currency of the vendor; and transferring said payment to the vendor from said funds in the local currency of the vendor on said settlement date.

16. The method of claim 15, wherein said determining an exchange rate includes adjusting said exchange rate according to a transaction fee, for performing said exchanging said payments through a currency exchange market, to provide funds in the local currency of the vendor.

17. The method of claim 1, wherein said receiving payment from the buyer is performed by a third party payment clearance mechanism to receive payment from the buyer.

18. The method of claim 17, wherein a plurality of third party payment clearance mechanisms are available for receiving payment from the buyer, such that the vendor selects one of said plurality of third party payment clearance mechanisms for said receiving payment from the buyer.

19. The method of claim 1, wherein payment from the buyer to the vendor is handled by a third party payment clearance service, wherein a risk to said third party clearance service is also hedged by said hedging enabler process.

20. The method of claim 1, wherein said determining said exchange rate comprises automatically detecting the local currency of the buyer.

21. The method of claim 20, wherein the buyer communicates with the vendor through a Web page and a Web server, and said automatic detection is performed through at least one of DNS lookup information or cookies.

22. A method for performing online hedging at a Web site for a transaction for purchasing a product by a buyer from a vendor, the product having a price, a local currency of the buyer being different from local currency of the vendor, the buyer communicating with the vendor through an electronic network, the method comprising:

determining an exchange rate, obtained through the electronic network, of the vendor to the local currency of the buyer;

converting the price of the product from the local currency of the vendor to the local currency of the buyer to form a final price according to said exchange rate, such that the buyer receives information concerning said final price before a payment transaction is performed;

hedging said payment transaction by a hedging enabler process, said hedging enabler process communicating only with the vendor;

receiving payment from the buyer for said final price to perform said payment transaction;

converting said payment from the local currency of the buyer to the local currency of the vendor to form a converted payment according to said exchange rate; and paying the vendor with said converted payment.

23. The method of claim 22, wherein payment from the buyer to the vendor is handled by a third party payment clearance service, wherein a risk to said third party payment clearance service is also hedged by said hedging enabler process.

24. A method for supporting a transaction for purchasing a product by a buyer from a vendor, the product having a price, a local currency of the buyer being different from a local currency of the vendor, the buyer communicating with the vendor through an electronic network, the method comprising:

determining an exchange rate, obtained through the electronic network, of the vendor to the local currency of the buyer;

converting the price of the product from the local currency of the vendor to the local currency of the buyer to form a final price according to said exchange rate, such that the buyer receives information concerning said final price before a payment transaction is performed;

receiving payment from the buyer for said final price to perform said payment transaction;

converting said payment from the local currency of the buyer to the local currency of the vendor to form a converted payment according to said exchange rate, wherein said exchange rate is guaranteed at a time of calculating said final price for the buyer, such that the price in the local currency of the vendor is guaranteed and such that the price in the local currency of the buyer is guaranteed; and paying the vendor with said conventional payment;

wherein hedging is performed for the period from said determining said exchange rate to said paying the vendor such that a risk of a change in said exchange rate is hedged and wherein said hedging is performed with at least one of an option or a forward contract.

25. A method for supporting a transaction for purchasing a product by a buyer from a vendor with a plurality of payments, the product having a price, a local currency of the buyer being different from a local buyer communicating with the vendor through an electronic network, the method comprising: the method comprising:

determining an exchange rate, obtained through the electronic network, of the vendor to the local currency of the buyer;

converting the price of the product from the local currency of the vendor to the local currency of the buyer to form a final price according to said exchange rate, such that the buyer receives information concerning said final price before a payment transaction is performed;

receiving payment from the buyer from said final price to perform said payment transaction;

converting said payment from the local currency of the buyer to the local currency of the vendor to form a conventional payment according to said exchange rate, wherein said converting the price of the product further comprises converting the price of the product to a plurality of payments for being paid by the buyer at a plurality of separate points in time, each payment being converted according to said exchange rate and each payment being hedged separately, such that said receiving payment from the buyer is performed repeatedly from each payment by the buyer; and paying the vendor with each converted payment;

wherein hedging is performed for the period from said determining said exchange rate to said paying the vendor for each converted payment such that a risk of a change in said exchange rate is hedged.

26. The method of claim 25, wherein said hedging is performed with at least one of an option or a forward contract.

\* \* \* \* \*

UNITED STATES PATENT AND TRADEMARK OFFICE
CERTIFICATE OF CORRECTION

PATENT NO. : 6,892,184 B1
DATED : May 10, 2005
INVENTOR(S) : Komem et al.

It is certified that error appears in the above-identified patent and that said Letters Patent is hereby corrected as shown below:

Title page,
Item [75], Inventors, change "Tai" to -- Tal --,
"Ishal" to -- Ishai --, the fourth inventor from "Shalgl"
to -- Shalgi --.

Signed and Sealed this

Twelfth Day of July, 2005

JON W. DUDAS
*Director of the United States Patent and Trademark Office*